(12) United States Patent
Nishida et al.

(10) Patent No.: US 9,180,916 B2
(45) Date of Patent: Nov. 10, 2015

(54) VEHICLE BODY LOWER SECTION STRUCTURE

(71) Applicant: TOYOTA JIDOSHA KABUSHIKI KAISHA, Toyota-shi, Aichi-ken (JP)

(72) Inventors: Gen Nishida, Toyota (JP); Akira Nishino, Aichi-gun (JP); Hideyuki Takahashi, Nisshin (JP); Satoshi Kasai, Nisshin (JP); Daisuke Noguchi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/547,790

(22) Filed: Nov. 19, 2014

(65) Prior Publication Data

US 2015/0145284 A1  May 28, 2015

(30) Foreign Application Priority Data

Nov. 25, 2013  (JP) .................... 2013-243338

(51) Int. Cl.
*B62D 25/08* (2006.01)
*B62D 25/20* (2006.01)
*B62D 25/14* (2006.01)

(52) U.S. Cl.
CPC .......... *B62D 25/2036* (2013.01); *B62D 25/145* (2013.01); *B62D 25/2018* (2013.01)

(58) Field of Classification Search
CPC ............. B62D 25/145; B62D 25/2018; B62D 25/2036; B62D 25/2045
USPC ............ 296/204, 203.01, 203.02, 193.07
See application file for complete search history.

(56) References Cited

U.S. PATENT DOCUMENTS

| | | | | |
|---|---|---|---|---|
| 6,270,152 B1 * | 8/2001 | Sato | ........................ | B62D 21/11 296/192 |
| 6,830,289 B2 * | 12/2004 | Miyabayashi | ....... | B62D 25/082 296/193.07 |
| 2011/0156446 A1 | 6/2011 | Iwase et al. | | |

FOREIGN PATENT DOCUMENTS

| | | |
|---|---|---|
| JP | 2005-153801 A | 6/2005 |
| JP | 2007-326578 A | 12/2007 |
| JP | 2009-248593 A | 10/2009 |
| JP | 2012-115876 A | 6/2012 |
| JP | 5041073 B2 | 10/2012 |
| WO | 2014/162493 A1 | 10/2014 |

* cited by examiner

*Primary Examiner* — Dennis H Pedder
(74) *Attorney, Agent, or Firm* — Oliff PLC

(57) ABSTRACT

A vehicle body lower section structure comprises a rocker that extends in a vehicle body front-rear direction at a vehicle width direction outside of a floor panel; a first cross member that extends in the vehicle width direction at a lower side of a dashboard panel and includes an outside end portion in the vehicle width direction coupled to the rocker; a second cross member that extends in the vehicle width direction at the vehicle body front side of the first cross member; and a coupling member that couples the first cross member and the second cross member together, and configures a closed cross-section structure with the dashboard panel and/or the floor panel.

7 Claims, 7 Drawing Sheets

VEHICLE BODY LOWER SECTION STRUCTURE

CROSS-REFERENCE TO RELATED APPLICATION

This application claims priority under 35 USC 119 from Japanese Patent Application, No. 2013-243338 filed Nov. 25, 2013, the disclosure of which is incorporated by reference herein.

BACKGROUND OF THE INVENTION

1. Technical Field

The present invention relates to a vehicle body lower section structure.

2. Related Art

As described in Japanese Patent No. 5041073, for example, a conventional vehicle body front section structure is proposed in which a dashboard cross member with a closed cross-section structure is provided to a dashboard panel, and the dashboard cross member is joined to a front pillar.

SUMMARY

However, there is room for improvement in a structure in order to efficiently disperse load input to a dashboard cross member in the event of a vehicle collision.

A subject of the present invention is therefore to obtain a vehicle body lower section structure that efficiently disperses load input to a cross member disposed at a dashboard panel side.

In order to realize the above subject, a vehicle body lower section structure of a first aspect of the present invention includes a rocker that extends in a vehicle body front-rear direction at outside in a vehicle width direction of a floor panel, a first cross member that extends in the vehicle width direction at a lower side of a dashboard panel and includes an outside end portion in the vehicle width direction coupled to the rocker, a second cross member that extends in the vehicle width direction at the vehicle body front side of the first cross member, and a coupling member that couples the first cross member and the second cross member together, and that configures a closed cross-section structure with the dashboard panel and/or the floor panel.

According to the first aspect, the first cross member and the second cross member that extend in the vehicle width direction are coupled together by the coupling member that configures a closed cross-section structure, and the outside end portion in the vehicle width direction of the first cross member is coupled to the rocker.

In the event of a small overlap collision or an offset collision, collision load input to the rocker through a front wheel is accordingly not only transmitted to the rocker, but also to the first cross member. The collision load transmitted to the first cross member is then also transmitted through the coupling member to the second cross member. Namely, the collision load input to the first cross member is efficiently dispersed.

A vehicle body lower section structure of a second aspect of the present invention is the vehicle body lower section structure of the first aspect, in which the coupling member extends in the vehicle body front-rear direction.

According to the second aspect, the coupling member extends in the vehicle body front-rear direction. Collision load input to the second cross member is thereby efficiently transmitted to the first cross member.

A vehicle body lower section structure of a third aspect of the present invention is the vehicle body lower section structure of the first aspect or the second aspect, further includes a floor reinforcement that extends in the vehicle body front-rear direction and that configures a closed cross-section structure with the floor panel, in which the coupling member configures a portion of the floor reinforcement.

According to the third aspect, the coupling member configures a portion of the floor reinforcement configuring a closed cross-section structure with the floor panel. Collision load input to the second cross member is thereby also transmitted through the coupling member to the floor reinforcement. Namely, the collision load input to the second cross member is efficiently dispersed.

A vehicle body lower section structure of a fourth aspect of the present invention is the vehicle body lower section structure of any one of the first aspect to the third aspect, in which the first cross member and the second cross member respectively configure a closed cross-section structure with the dashboard panel and/or the floor panel.

According to the fourth aspect, the first cross member and the second cross member respectively configure a closed cross-section structure with the dashboard panel and/or the floor panel. Ease of assembly of the first cross member and the second cross member is thereby enhanced in comparison to cases in which the first cross member itself and the second cross member itself are configured with closed cross-section structures.

A vehicle body lower section structure of a fifth aspect of the present invention is the vehicle body lower section structure of any one of the first aspect to the fourth aspect, in which the first cross member, the second cross member, and the coupling member are integrally formed together.

According to the fifth aspect, the first cross member, the second cross member, and the coupling member are integrally formed together. The rigidity (strength) of the first cross member, the second cross member, and the coupling member is thereby increased, and the number of components is reduced, compared to a configuration in which the first cross member, the second cross member, and the coupling member are not integrally formed.

A vehicle body lower section structure of a sixth aspect of the present invention is the vehicle body lower section structure of any one of the first aspect to the fifth aspect, in which an outside end portion in the vehicle width direction of the second cross member is joined to a lower side of a front pillar.

According to the sixth aspect, the outside end portion in the vehicle width direction of the second cross member is joined to the lower side of the front pillar. In the event of a small overlap collision or an offset collision, collision load input through the front wheel to the rocker and the front pillar is thereby not only transmitted to the rocker and the front pillar, but also to the first cross member and the second cross member. Collision load transmitted to the first cross member is also transmitted through the coupling member to the second cross member, and collision load transmitted to the second cross member is also transmitted through the coupling member to the first cross member. Namely, collision load input to the first cross member and the second cross member is efficiently dispersed.

A vehicle body lower section structure of a seventh aspect of the present invention is the vehicle body lower section structure of any one of the first aspect to the sixth aspect, further including a side member that extends in the vehicle body front-rear direction, wherein the coupling member is disposed in a position superimposed on the side member in plan view.

According to the seventh aspect, the coupling member is disposed in a position superimposed on the side member in plan view. In the event of a small overlap collision or an offset collision, collision load input to the side member is thereby transmitted to the coupling member, and transmitted from the coupling member to the first cross member and the second cross member. Namely, the collision load input to the side member and transmitted to the first cross member and the second cross member is efficiently dispersed.

As explained above, according to the first aspect, load input to the first cross member that is disposed at the dashboard panel side can be efficiently dispersed.

According to the second aspect, load input to the second cross member that is disposed at the dashboard panel side can be efficiently transmitted to the first cross member.

According to the third aspect, load input to the second cross member can be efficiently dispersed.

According to the fourth aspect, ease of assembly of the first cross member and the second cross member can be improved.

According to the fifth aspect, the rigidity (strength) of the first cross member, the second cross member, and the coupling member can be enhanced, and the number of components can be reduced.

According to the sixth aspect, load input to the first cross member and the second cross member can be efficiently dispersed.

According to the seventh aspect, load input to the side member and transmitted to the first cross member and the second cross member can be efficiently dispersed.

BRIEF DESCRIPTION OF THE DRAWINGS

Embodiments of the present invention will be described in detail based on following figures, wherein.

DETAILED DESCRIPTION OF THE INVENTION

Detailed explanation follows regarding an exemplary embodiment of the present invention, based on the drawings. Note that for ease of explanation, in each of the drawings, the arrow UP indicates the vehicle body upward direction, the arrow FR indicates the vehicle body front direction, the arrow LE indicates the vehicle body left direction, and the arrow RI indicates the vehicle body right direction, as appropriate. Moreover, reference in the below explanation to the front-rear, up-down and left-right directions without specific explanation refers to the front-rear of the vehicle body front-rear direction, the up-down of the vehicle body up-down direction, and the left-right of the vehicle body left-right direction (vehicle width direction). Moreover, FIG. 2 to FIG. 4 illustrate the left side of a vehicle body, and since the right side of the vehicle body is the same but with left-right symmetry, explanation regarding the right side of the vehicle body is omitted as appropriate.

Figure 2:
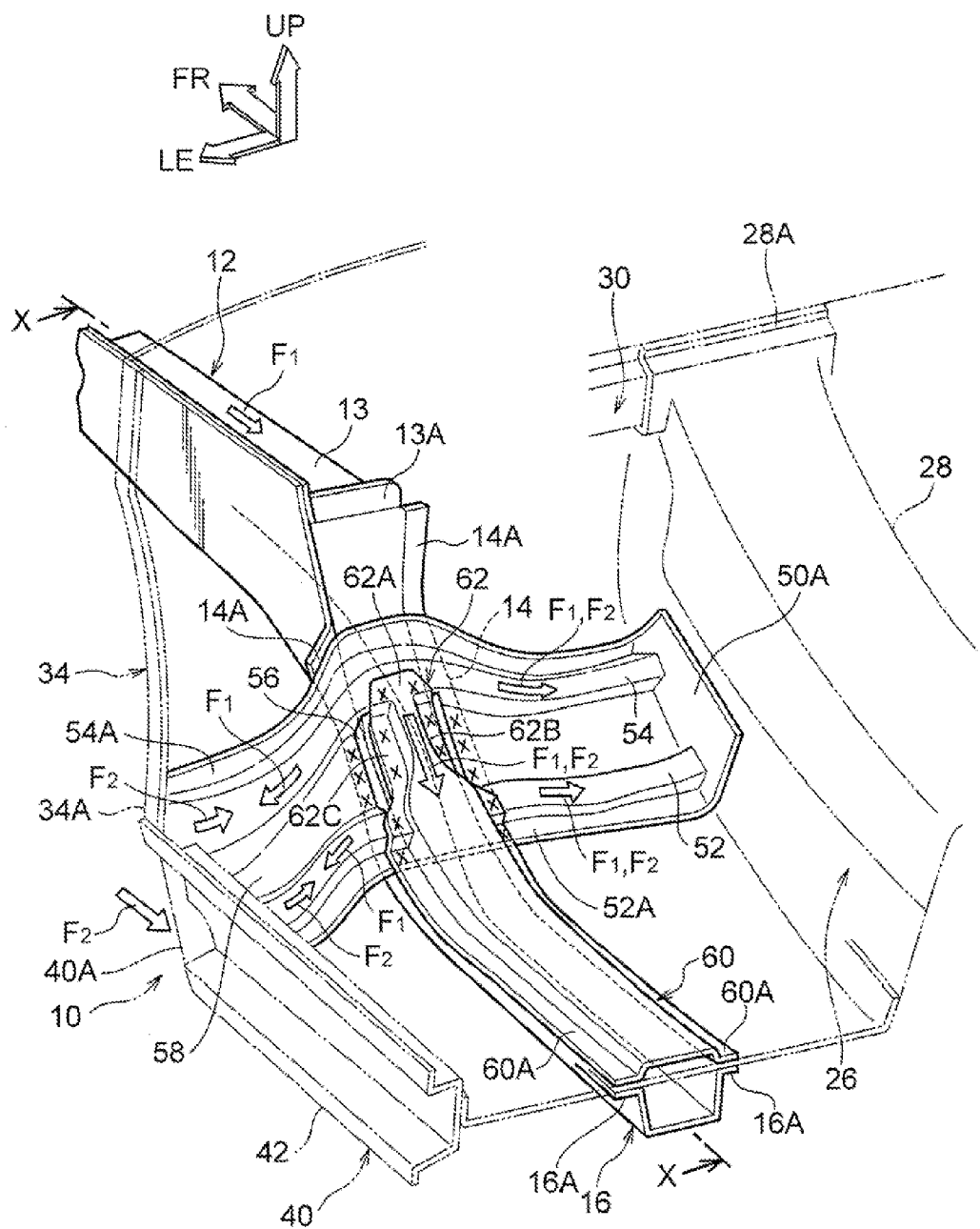
FIG. 2 is a perspective view illustrating a vehicle body lower section structure according to the exemplary embodiment together with a front side member.
Figure 3:
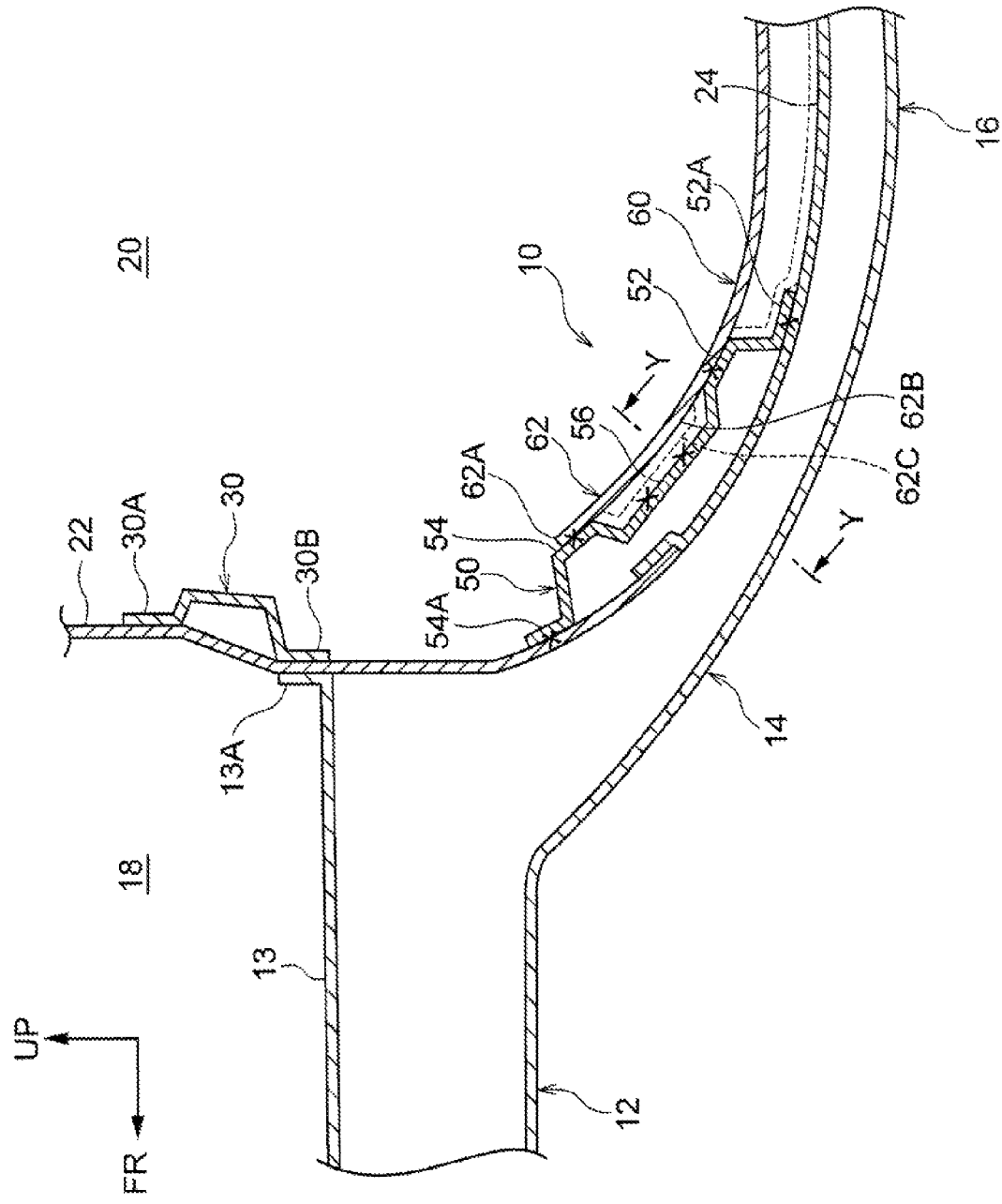
FIG. 3 is a cross-section view taken along line X-X in FIG. 2, as viewed in the direction indicated by the arrows.
Figure 4:
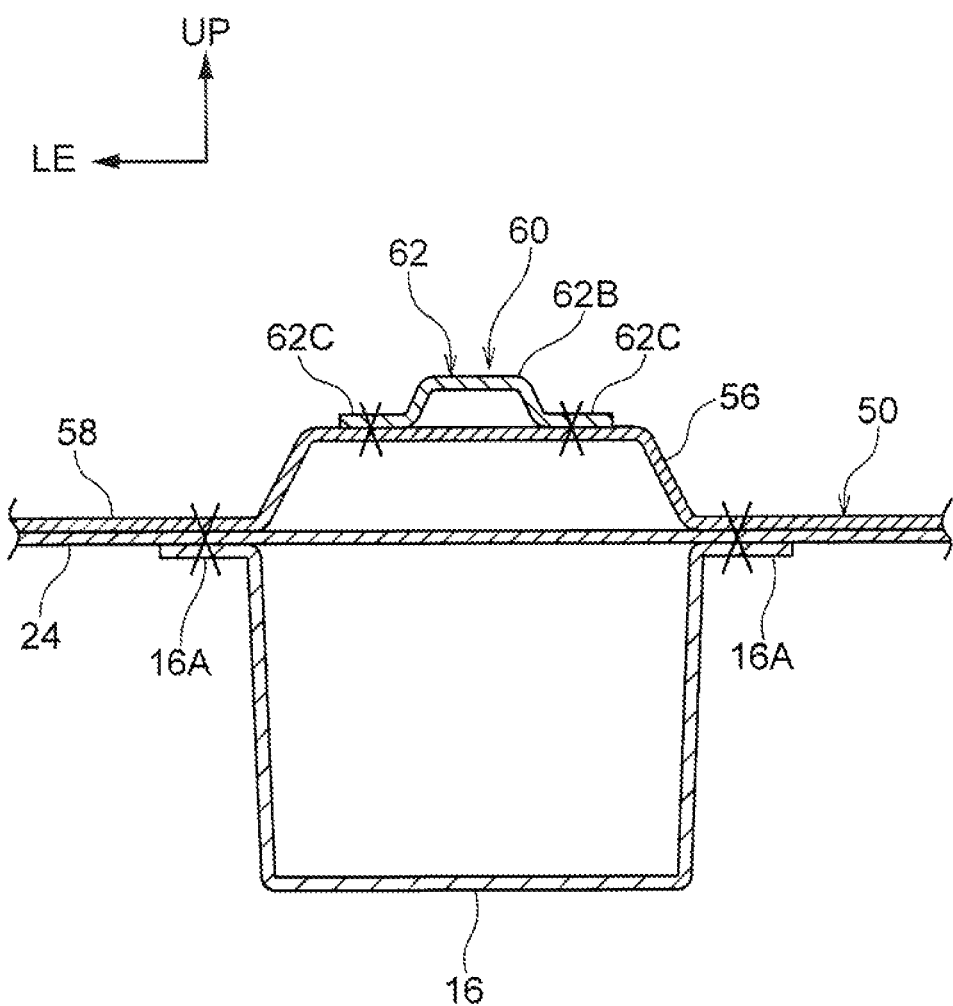
FIG. 4 is a cross-section view taken along line Y-Y in FIG. 3, as viewed in the direction indicated by the arrows.

As illustrated in FIG. 2 and FIG. 3, a left and right pair of front side members 12 are disposed at a vehicle body front section upper side of a vehicle. Each of the front side members 12 has rectangular closed cross-section shape, extends along the vehicle body front-rear direction, and configures vehicle body frame members. A front bumper reinforcement (not illustrated in the drawings), that has rectangular closed cross-section shape and extends in the vehicle width direction, is disposed spanning between front end portions of the respective front side members 12.

A kick portion 14, that inclines toward the vehicle body rear lower side and that is formed with a hat shaped cross-section and protrudes toward the lower side, is contiguously provided integrally to the rear portion of the from side member 12. The kick portion 14 straddles across a back face (front face) of a dashboard panel 22 partitioning between an engine compartment room 18 and a vehicle cabin 20, and a back face (lower face) of a floor panel 24 configuring a vehicle body floor. Left and right flange portions 14A of the kick portion 14 are joined (welded) to the respective back faces of the dashboard panel 22 and the floor panel 24, thereby configuring a closed cross-section structure.

Positions at which the dashboard panel 22 and the floor panels 24 are contiguously provided may be at a front side, or may be at a rear side, of dashboard lower cross members 50, described later. Namely, the dashboard lower cross member 50 may be joined straddling the dashboard panel 22 and the floor panel 24, or may be joined only to the dashboard panel 22, or joined only to the floor panel 24.

As illustrated in FIG. 2 and FIG. 3, a rear end portion of an upper wall 13 of the front side member 12 is configured as a flange portion 13A formed by bending upward. The flange portion 13A is joined by spot welding to the back face (front face) of the dashboard panel 22.

An under reinforcement 16 formed extending toward the vehicle body rear side with a hat-shaped cross-section protruding to the lower side is contiguously provided integrally to a rear portion of each of the kick portions 14. Left and right flange portions 16A of the under reinforcement 16 are joined (welded) to the back face (lower face) of the floor panel 24 that forms a contiguous unit from the dashboard panel 22 toward the vehicle body rear side, thereby configuring a closed cross-section structure.

Figure 1:
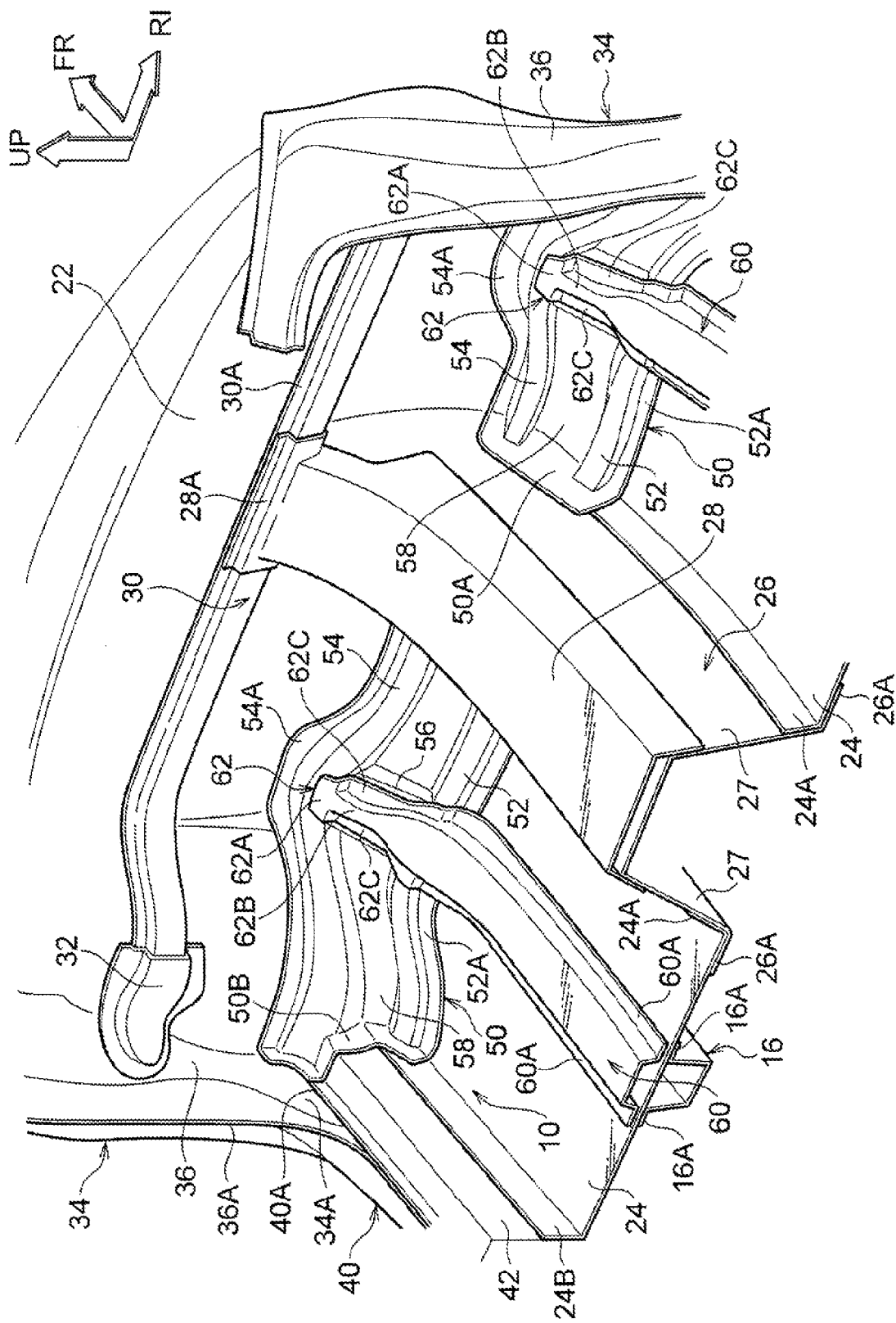
FIG. 1 is a perspective view illustrating a vehicle body lower section structure according to an exemplary embodiment.

As illustrated in FIG. 1 and FIG. 2, a floor tunnel section 26, extending in the vehicle body front-rear direction and configuring a vehicle body frame member, is provided at a center lower section in the vehicle width direction of the vehicle. The floor tunnel section 26 is formed in a hat shaped cross-sections protruding toward the upper side, and left and right flange portions 26A are joined (welded) to back faces (lower faces) of inside end portions in the vehicle width direction of the respective floor panels 24.

The inside end portions of the floor panels 24 each configures a flange portion 24A formed bending upward, and each of the flange portions 24A is joined (welded) to respective left and right side walls 27 of the floor tunnel section 26. A front end portion of the floor tunnel section 26 is integrally joined to a center lower portion in the vehicle width direction of the surface (rear face) of the dashboard panel 22.

An upper portion of the floor tunnel section 26 is further provided with a panel member 28, that has substantially inverted "U" shaped cross-section and is formed with a shift lever insertion hole, or the like, not illustrated in the drawings. A front end portion 28A of the panel member 28 is joined to a dashboard upper cross member 30 by nuts and bolts, for example (not illustrated in the drawings).

As illustrated in FIG. 1 to FIG. 3, the dashboard upper cross member 30 extends across substantially the entire vehicle width direction, and is formed in a hat shaped cross-section protruding toward the rear side. Upper and lower flange portions 30A and 30B of the dashboard upper cross member 30 are each joined (welded) to an upper portion of the surface rear face) of the dashboard panel 22, thereby configuring a closed cross-section structure.

Note that, as illustrated in FIG. 3, a portion of the lower flange portion 30B of the dashboard upper cross member 30 is disposed facing the flange portion 13A of the upper wall 13 of the front side member 12, with the dashboard panel 22 interposed therebetween. Configuration is thereby made such that collision load input to the front side member 12 is also transmitted to the dashboard upper cross member 30.

Figure 6:
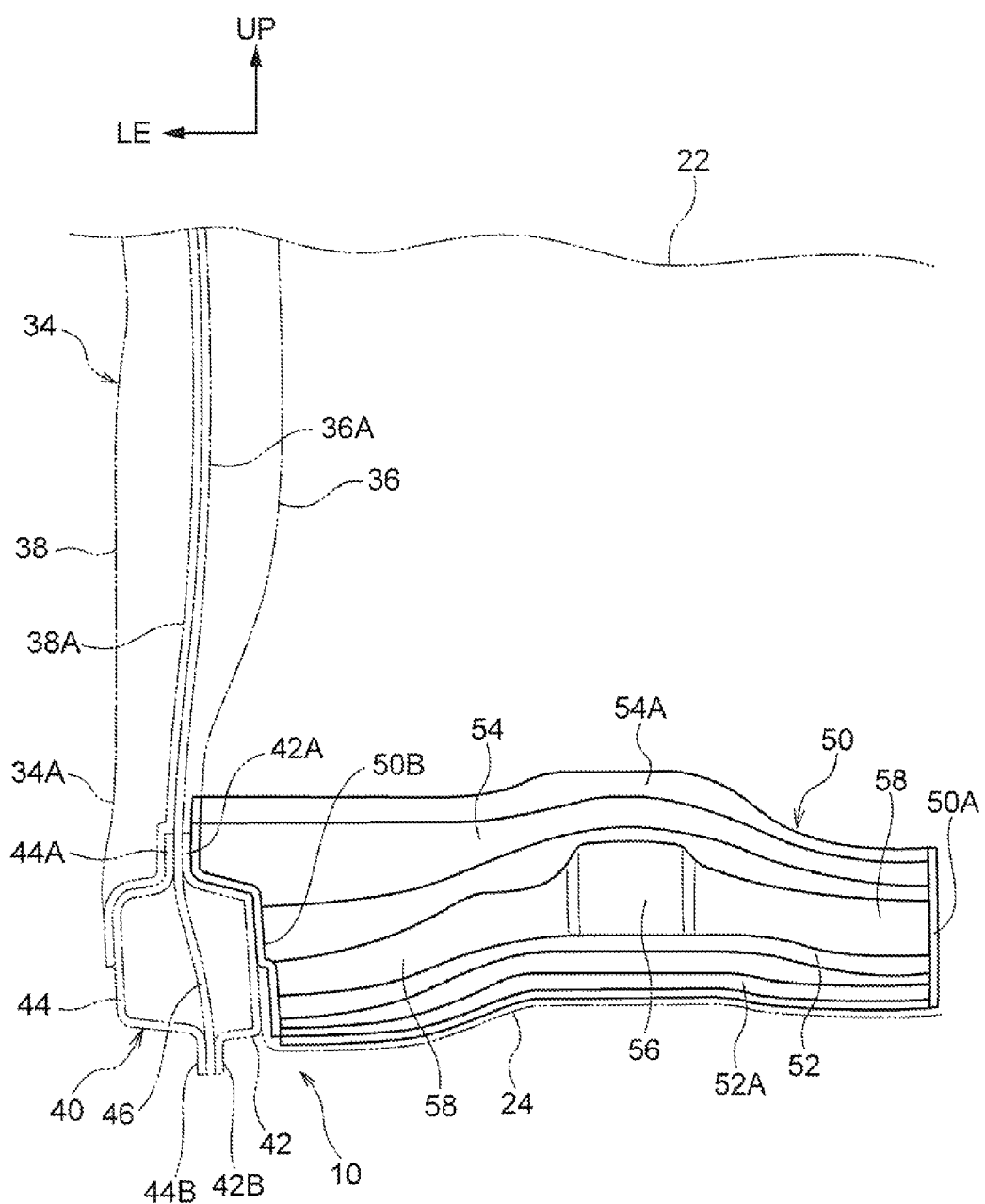
FIG. 6 is a back face view illustrating a first cross member and a second cross member configuring a vehicle body lower section structure according to the exemplary embodiment.

As illustrated in FIG. 1, FIG. 2, and FIG. 6, both left and right end edge portions of the dashboard panel 22 are joined to respective inner panels 36 of left and right front pillars 34, that extends in the vehicle body up-down direction at outside in the vehicle width direction. Both end portions 32 in the vehicle width direction of the dashboard upper cross member 30 are respectively joined to the left and right end edge portions of the dashboard panel 22, and to the inner panels 36 of the left and right front pillars 34, by nuts and bolts (not illustrated in the drawings).

The inner panel 36 is formed in hat shaped cross-sections protruding toward the inside and an outer panel 38 is formed in hat shaped cross-sections protruding toward the outside, and front and rear flange portions 36A of the inner panel 36 and front and rear flange portions 38A of outer panel 38 are mutually joined (welded) together such that the front pillar 34 configures closed cross-section structure.

As illustrated in FIG. 1, FIG. 2, FIG. 6, and FIG. 7, rockers 40, extending in the vehicle body front-rear direction and configuring vehicle body frame members, are provided to vehicle width direction outside lower sections of the vehicle. The rockers 40 each includes an inner panel 42 that has a hat shaped cross-section protruding toward the inside, an outer panel 44 that has a hat shaped cross-section protruding toward the outside, and a substantially flat plate shaped rocker reinforcement 46 provided between the inner panel 42 and the outer panel 44.

An upper flange portion 42A and a lower flange portion 428 of the inner panel 42, and an upper flange portion 44A and a lower flange portion 44B of the outer panel 44 are respectively joined (welded) to an inside face and an outside face of the rocker reinforcement 46, that is integrated to the front and rear flange portions 36A of the inner panel 36, thereby configuring the rocker 40 with a closed cross-section structure.

As illustrated in FIG. 1, outside end portions in the vehicle width direction of the respective floor panels 24 configure flange portions 24B formed bending upward, and the flange portions 24B are joined (welded) to the respective inner panels 42 of the rockers 40. Namely, the rockers 40 extend in the vehicle body front-rear direction at outside in the vehicle width direction of the floor panels 24.

As illustrated in FIG. 1 to FIG. 3, a left and right pair of the dashboard lower cross members 50 are provided extending in the vehicle width direction. The dashboard lower cross members 50 are interposed between the dashboard panel 22 and the floor panels 24 so as to be disposed on the surface (rear face) at the lower side of the dashboard panel 22 and on the surface (upper face) at the front side of the floor panels 24. The dashboard lower cross members 50 are provided on the opposite side to the kick portions 14 side of the dashboard panel 22 and the floor panels 24.

The dashboard lower cross member 50, configuring a vehicle body lower section structure 10, couples together the floor tunnel section 26 and the rocker 40 in the vehicle width direction, and inside end portion in the vehicle width direction of the dashboard lower cross member 50 configures a flange portion 50A formed bending upward. The flange portion 50A is joined by spot welding so as to straddle between the flange portion 24A of the floor panel 24 and the side wall 27 of the floor tunnel section 26 (or is joined to the side wall 27 only).

Figure 5:
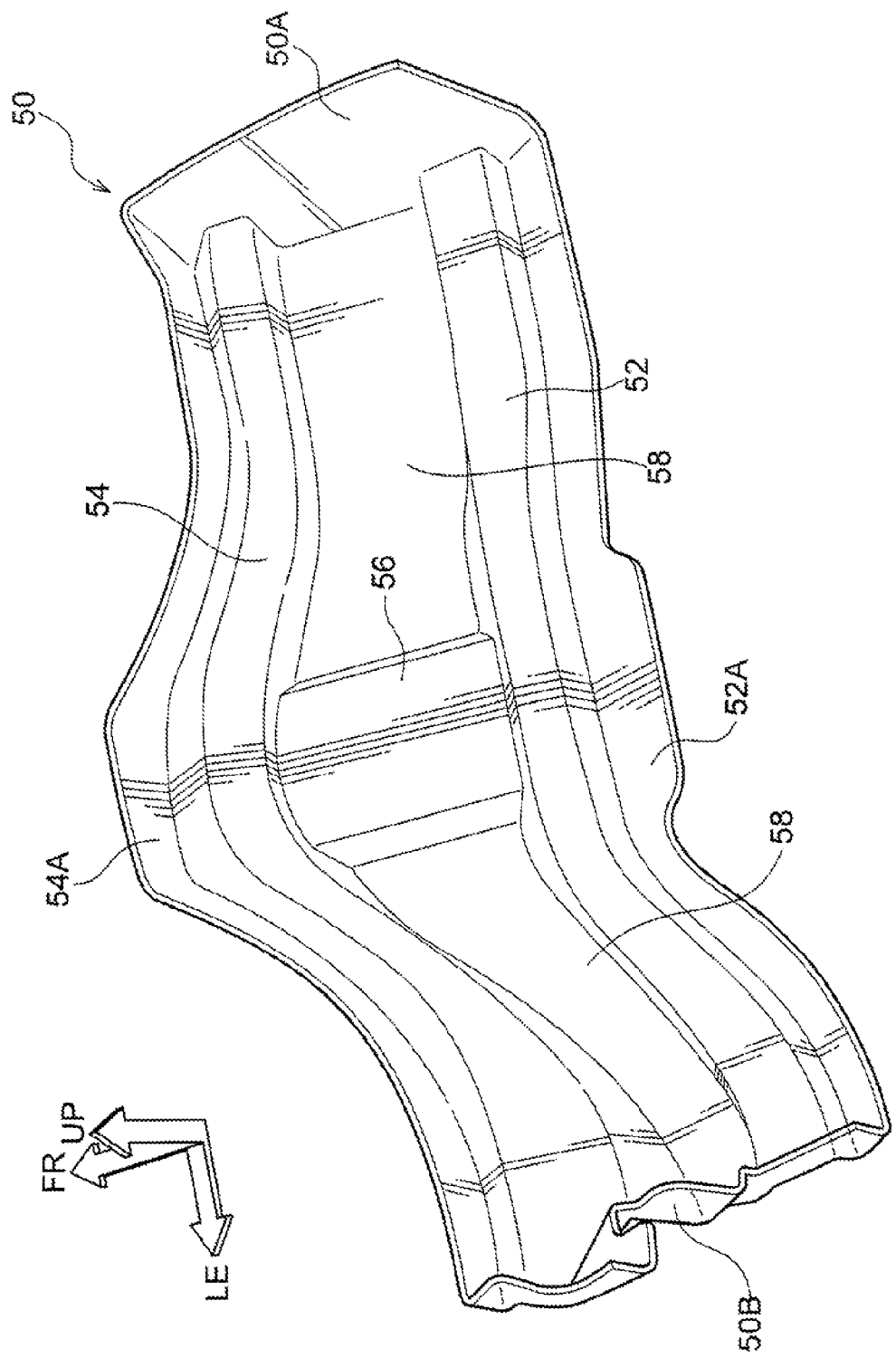
FIG. 5 is a perspective view illustrating a first cross member and a second cross member configuring a vehicle body lower section structure according to the exemplary embodiment.

As illustrated in FIG. 5, the dashboard lower cross members 50 each includes a first cross member 52 and a second cross member 54. The first cross member 52 extends in the vehicle width direction at the surface (upper face) side of the floor panel 24 and has a hat shaped cross-section protruding toward the upper side. The second cross member 54 extends in the vehicle width direction at the surface (rear face) side of the dashboard panel 22 at the vehicle body front side of the first cross member 52, and has a hat shaped cross-section protruding toward the upper side.

The dashboard lower cross members 50 each also includes a coupling member 56 that extends in the vehicle body front-rear direction and integrally couples together the first cross member 52 and he second cross member 54 in the vehicle body front-rear direction, and that has a hat shaped cross-section protruding toward the upper side. The coupling member 56 couples a substantially center portion in the vehicle width direction of the first cross member 52 and a substantially center portion in the vehicle width direction of the second cross member 54. The center portions of the first cross member 52 and the second cross member 54 are positioned between the left and right flange portions of the kick portion 14 in plan view.

Furthermore, a front side flange portion of the first cross member 52, a rear side flange portion of the second cross member 54, and both left and right side flange portions of the coupling members 56 of the dashboard lower cross member 50 are contiguously provided integrally to each other, such that the first cross member 52, the second cross member 54 and the coupling member 56 configure an integral unit.

Note that the dashboard lower cross member 50 may be configured such that the front side flange portion of the first cross member 52, the rear side flange portion of the second cross member 54, and both left and right side flange portions of the coupling member 56 are not contiguously provided integrally to each other.

However, when the flange portions described above are contiguously provided integrally to each other (the contiguously provided integral location is hereafter referred to as a "contiguous portion 58"), and the first cross member 52, the second cross member 54 and the coupling member 56 configure an integral unit, the strength (rigidity) thereof is enhanced, and the number of components in the dashboard lower cross member 50 is reduced.

As illustrated in FIG. 3, a rear side flange portion 52A of the first cross member 52 is joined by spot welding to the surface (upper face) of the floor panel 24 and a front side flange portion 54A of the second cross member 54 is joined by spot welding to the surface rear face) of the dashboard panel 22.

The dashboard lower cross member 50 (the first cross member 52, the second cross member 54, and the coupling member 56) thereby configures a closed cross-section structure with the dashboard panel 22 and the floor panel 24, and the closed cross-section structure is easily configured. Namely, ease of assembly of the dashboard lower cross members 50 to the vehicle body is improved.

Note that, as described above, the dashboard lower cross member 50 may configure a closed cross-section structure with only the dashboard panel 22, or may configure a closed cross-section structure with only the floor panel 24, depending on what location the dashboard panel 22 and the floor panel 24 are contiguously provided.

The rear side flange portion 52A of the first cross member 52 and the front side flange portion 54A of the second cross member 54 are also spot welded to the flange portion 14A of the kick portion 14 with the floor panel 24 interposed therebetween. The contiguous portion 58 at both left and right sides of the coupling member 56 between the first cross member 52 and the second cross member 54 is also spot welded to the flange portion 14A of the kick portion 14 with the floor panel 24 interposed therebetween, as shown in FIG. 2.

In other words, the coupling member 56 is provided between the left and right spot weld portions, such that the coupling member 56 is disposed in a position superimposed on the kick portion 14 (front side member 12) in plan view and in back face view. Namely, the coupling member 56 is disposed at the upper side of the kick portion 14 (front side member 12), running along the extension direction of the kick portion 14 (front side member 12).

Although the front side flange portion 54A of the second cross member 54 is disposed more to the lower side than the front side member 12 in the side cross-section illustrated in FIG. 3, the flange portion 54A may be provided so as to extend up to a height position in the proximity of the upper wall 13 of the front side member 12 in order to increase the transmission efficiency of collision load input to the front side member 12.

As illustrated in FIG. 1, FIG. 2, FIG. 6 and FIG. 7, an outside end portion in the vehicle width direction of the dashboard cross member 50 configures flange portion SOB formed by bending upward and rearward. The flange portion 50B is joined (coupled) by spot welding so as to straddle across a front end portion 40A of the rocker 40 and a lower end portion (lower side) 34A of the front pillar 34.

To explain in detail, a portion of the flange portion 5013 formed to the first cross member 52 (including the rear side flange portion 52A) and an outside end portion in the vehicle width direction of the contiguous portion 58 is joined by spot welding to the inner panel 42 of the front end portion 40A of the rocker 40 (and to the flange portion 2413 of the floor panel 24).

Figure 7:
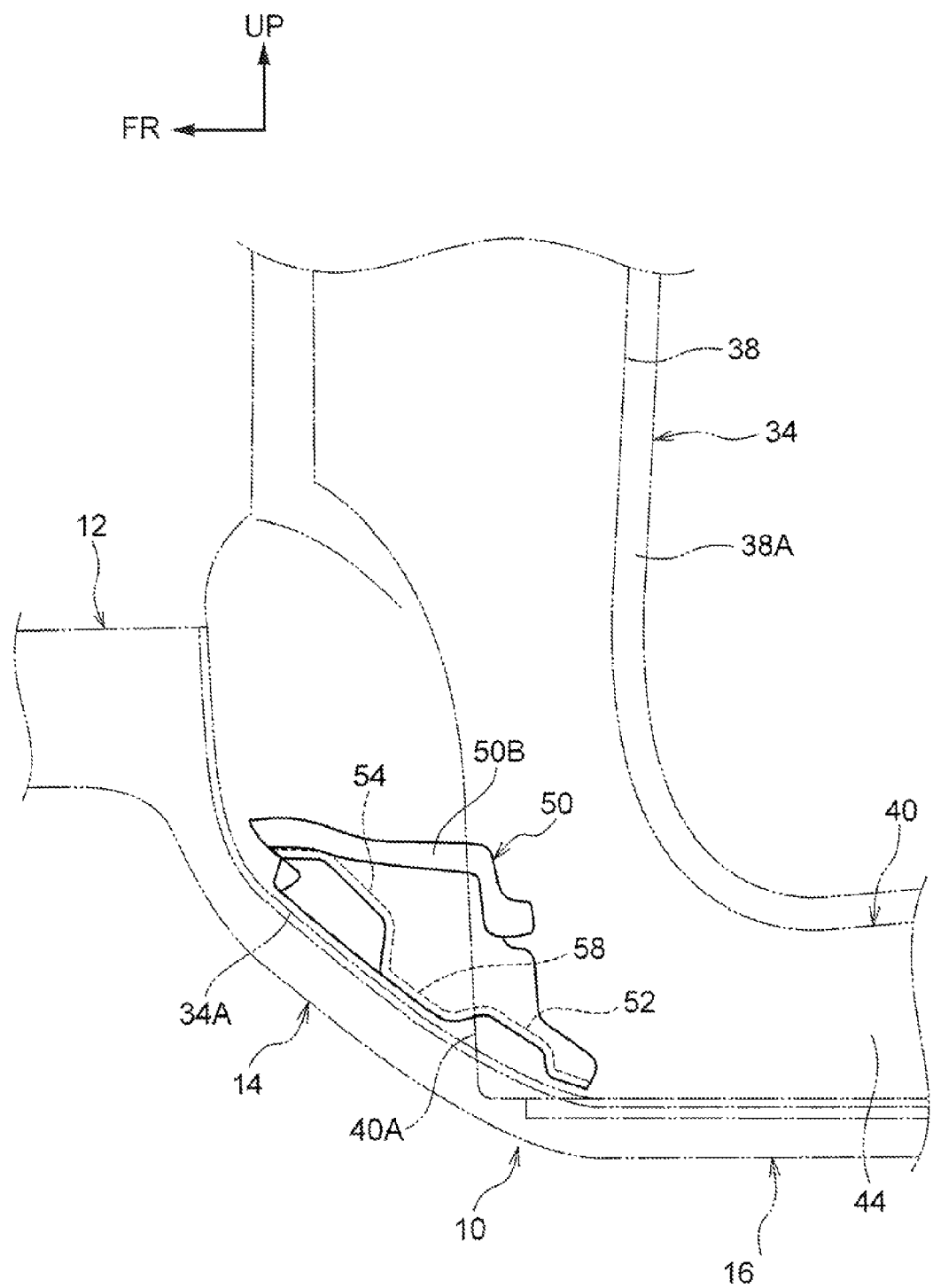
FIG. 7 is a side view illustrating a first cross member and a second cross member configuring a vehicle body lower section structure according to the exemplary embodiment.

A portion of the flange portion 50B formed to an outside end portion in the vehicle width direction of the second cross member 54 (including the front side flange portion 54A) is joined by spot welding to the inner panel 42 of the front end portion 40A of the rocker 40, and the inner panel 36 of the lower end portion 34A of the front pillar 34 (see FIG. 6 and FIG. 7).

Due to joining the outside end portions in the vehicle width direction of the first cross member 52 and the second cross member 54, configured with closed cross-section structures, to the front end portion 40A of the rocker 40 and the lower end portion 34A of the front pillar 34 in this manner, the strength of the front end portion 40A of the rocker 40 and the lower end portion 34A of the front pillar 34 is reinforced by the dashboard lower cross member 50.

if a front wheel (omitted from the drawings) moves backward due to a small overlap collision or an offset collision, for example, and collides with the front end portion 40A of the rocker 40 and the lower end portion 34A of the front pillar 34, the collision load can thereby be transmitted through the first cross member 52 and the second cross member 54 to the floor tunnel section 26.

As illustrated in FIG. 1 to FIG. 4, upper reinforcements 60, that have hat shaped cross-sections protruding toward the upper side, are disposed extending in the vehicle body front-rear direction at the surface (upper face) of the floor panels 24 at the opposite side to the kick portions 14 and the under reinforcements 16, such that the floor panels 24 are interposed therebetween.

Each of the upper reinforcements 60, serving as a floor reinforcement, configures a closed cross-section structure, due to left and right flange portions 60A that are respectively joined by spot welding to the surface (upper face) of the floor panel 24. A front end portion 62 of the upper reinforcement 60 is joined to the dashboard lower cross member 50 by spot welding, thereby configuring a closed cross-section structure.

To explain in detail, the front end portion 62 of the upper reinforcement 60 is formed substantially "T" shaped in plan view, and a leading end portion 62A thereof extending in the vehicle width direction is joined to an upper wall of the second cross member 54 by spot welding. Projecting portions 62C projecting to the left and right from a lower side of a narrow width portion 62B formed to a rear side of the leading end portion 62A are joined to an upper wall of the coupling member 56 by spot welding.

The front end portion 62 of the upper reinforcement 60 is thereby configured so as to cover the entire coupling member 56 from above, and the coupling member 56 configures a portion of the upper reinforcement 60. Note that, although some of the spot weld portions of the dashboard lower cross member 50 are indicated by "x" in FIG. 2 to FIG. 4, the spot welding portions are not limited, to the illustrated positions.

Explanation follows regarding operation of the vehicle body lower section structure 10 with the above configuration.

As illustrated in in FIG. 2, collision load F1 is input to the front side member 12 in the event of an offset collision of the vehicle. The collision load F1 input to the front side member 12 is transmitted to the under reinforcement 16 through the kick portion 14, and also transmitted to the dashboard lower cross member 50. The load share of the kick portion 14 and the under reinforcement 16 is thereby reduced.

The collision load F1 transmitted (input) to the dashboard lower cross member 50 is further transmitted by the second cross member 54 to the front pillar 34 and the floor tunnel section 26, and also transmitted by the coupling member 56 to the first cross member 52, and transmitted from the first cross member 52 to the rocker 40 and the floor tunnel section 26.

The collision load F1 transmitted (input) to the dashboard lower cross member 50 is also transmitted from the coupling member 56 to the upper reinforcement 60. Thus the collision load transmitted (input) from the front side member 12 to the dashboard lower cross member 50 is efficiently dispersed to the floor tunnel section 26, the front pillar 34, the rocker 40, and the upper reinforcement 60.

Moreover, the front end portion 62 of the upper reinforcement 60 is joined to the dashboard lower cross member 50 so as to cover the coupling member 56 from above. A bending moment toward the vehicle body upper side, which is caused by backward movement of the kick portion 14 toward the vehicle body rear side, is applied to the dashboard lower cross member 50 through the dashboard panel 22 and the floor panel 24 with a lower end portion of the kick portion 14 as a pivot point. Such a bending moment can be restrained and reduced by the upper reinforcement 60.

In other word, bearing of bending load (cross-sectional load bearing) of the kick portion 14 in the event of an offset collision or a full overlap collision can thereby be enhanced by the upper reinforcement 60. Accordingly, bending (lifting up) deformation of the front side member 12 toward the vehicle body upper side with the lower end portion of the kick portion 1.4 as the pivot point can thereby be suppressed or prevented, and deformation of the vehicle cabin 20 due to backward movement of the front side member 12 and the kick portion 14 can be suppressed or prevented.

Moreover, in the event of a small overlap collision or an offset collision of the vehicle, the front wheel (omitted from the drawings) moves backward toward the vehicle body rear side, and collides with the front end portion 40A of the rocker 40 and the lower end portion 34A of the front pillar 34. Namely, as illustrated in FIG. 2, a collision load F2 is input to the front end portion 40A of the rocker 40, and to the lower end portion 34A of the front pillar 34.

A portion of the collision load F2 input to the lower end portion 34A of the front pillar 34 is transmitted to the front pillar 34, and also transmitted by the second cross member 54 of the dashboard lower cross member 50 to the floor tunnel section 26. A portion of the collision load F2 is also transmitted from the second cross member 54, through the coupling member 56, to the first cross member 52, and is transmitted by the first cross member 52 to the floor tunnel section 26, A portion of the collision load F2 input to the front end portion 40A of the rocker 40 is transmitted to the rocker 40, and is also transmitted by the first cross member 52 of the dashboard lower cross member 50 to the floor tunnel section 26. A portion of the collision load F2 is also transmitted from the first cross member 52, through the coupling member 56, to the second cross member 54, and transmitted by the second cross member 54 to the floor tunnel section 26.

A portion of the collision load F2 input to the front end portion 40A of the rocker 40 is also transmitted through the coupling member 56 to the upper reinforcement 60. The collision load F2 transmitted (input) from the lower end portion 34A of the front pillar 34 and the front end portion 40A of the rocker 40 to the dashboard lower cross member 50 is thereby efficiently dispersed to the floor tunnel section 26 and the upper reinforcement 60.

The load share on the front pillar 34 and the rocker 40 in the event of a small overlap collision or an offset collision can thereby be reduced, and bending deformation (inner folding) of the rocker 40 to the vehicle width direction inside can be suppressed (bending moment can be reduced). Namely, deformation of the vehicle cabin 20 due to intrusion of the rocker 40 toward the vehicle width direction inside can be suppressed or prevented.

Moreover, since, due to the dashboard lower cross member 50, a portion of the collision load input to the lower end portion 34A of the front pillar 34 and the front end portion 40A of the rocker 40 can he borne by the floor tunnel section 26. localized deformation of the front pillar 34 and the rocker 40 can be suppressed. This enables the load bearing of vehicle body frame members such as the front pillars 34 and the rockers 40 to be lowered by reducing the plate thickness of those members, for example, enabling weight reduction and cost reduction of the vehicle to be realized.

Explanation has been given above regarding the vehicle body lower section structure 10 according to the present exemplary embodiment based on the drawings, however there is no limitation of the vehicle body lower section structure 10 according to the present exemplary embodiment to the configurations illustrated in the drawings, and the design may be varied as appropriate within a range not departing from the scope of the present invention. For example, the coupling member 56 is not limited to a configuration extending in the vehicle body front-rear direction, and may be configured so as to extend diagonally with respect to the vehicle body front-rear direction and the vehicle width direction in plan view.

The position at which the coupling member 56 is provided is therefore not limited to the vehicle width direction substantially center portions of the first cross member 52 and the second cross member 54 (between the left and right flange portions 14A in plan view). Moreover, although as illustrated in FIG. 3, the dashboard panel 22 and the floor panels 24 are separate units contiguously provided as an integral unit, configuration is not limited thereto, and a configuration in which both units are integrated together may be applied.

Although in the vehicle body lower section structure 10 according to the present exemplary embodiment, configuration is such that the dashboard lower cross member SO, the upper reinforcement 60, and so on are joined by spot welding to the dashboard panel 22, the floor panels 24, and the like, the joining means is not limited thereto. For example, a configuration may be applied in which joining is performed by laser welding to join in spot shapes, by gradually reducing a weld radius using a laser (see JP-A No. 2012-115876).

What is claimed is:

1. A vehicle body lower section structure comprising:
   a rocker that extends in a vehicle body front-rear direction at a vehicle width direction outside of a floor panel;
   a first cross member that extends in the vehicle width direction at a lower side of a dashboard panel and includes an outside end portion in the vehicle width direction overlapped to the rocker;
   a second cross member that extends in the vehicle width direction at the vehicle body front side of the first cross member; and
   a coupling member that couples the first cross member and the second cross member together, and configures a closed cross-section structure with the dashboard panel and/or the floor panel.

2. The vehicle body lower section structure of claim 1, wherein the coupling member extends in the vehicle body front-rear direction.

3. The vehicle body lower section structure of claim 1, further comprising:
   a floor reinforcement that extends in the vehicle body front-rear direction and configures a closed cross-section structure with the floor panel,
   wherein the coupling member configures a portion of the floor reinforcement.

4. The vehicle body lower section structure of claim 1, wherein the first cross member and the second cross member respectively configure a closed cross-section structure with the dashboard panel and/or the floor panel.

5. The vehicle body lower section structure of claim 1, wherein the first cross member, the second cross member, and the coupling member are integrally formed together.

6. The vehicle body lower section structure of claim 1, wherein an outside end portion in the vehicle width direction of the second cross member is joined to a lower side of a front pillar.

7. The vehicle body lower section structure of claim 1, further comprising:
   a side member that extends in the vehicle body front-rear direction, wherein the coupling member is disposed in a position superimposed on the side member in plan view.

* * * * *